UNITED STATES PATENT OFFICE.

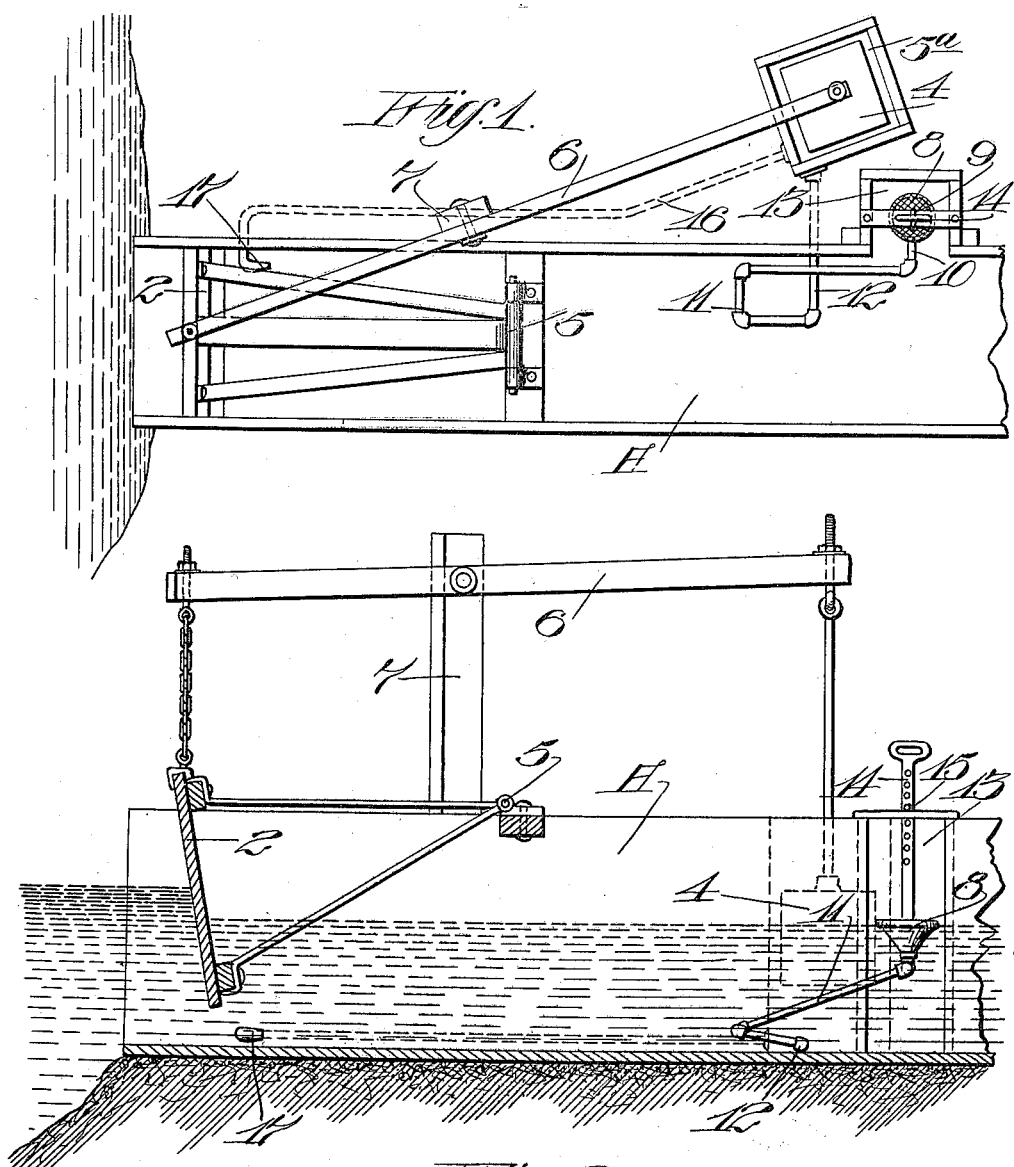

ADONIRAM J. COLLAR, OF YREKA, CALIFORNIA.

DITCH-GATE.

1,011,120.   Specification of Letters Patent.   Patented Dec. 5, 1911.

Application filed April 17, 1911. Serial No. 621,669.

*To all whom it may concern:*

Be it known that I, ADONIRAM J. COLLAR, citizen of the United States, residing at Yreka, in the county of Siskiyou and State of California, have invented new and useful Improvements in Ditch-Gates, of which the following is a specification.

This invention relates to ditch gates.

The object of the present invention is to provide a simple, reliable, effective and automatically operable gate for controlling the passage of water through flumes, ditches, canals or other conduits through which water is to be delivered in certain definite quantities.

The invention consists of the parts and the construction and combination of parts, as hereinafter more fully described and claimed, having reference to the accompanying drawings, in which—

Figure 1 is a plan view of the improved ditch gate. Fig. 2 is a central longitudinal section through the gate and ditch.

In the present embodiment of my invention A represents a ditch, canal or flume into which water is delivered from a suitable source, as a reservoir, main canal or other head water.

Vertically adjustable in the ditch and close to its intake is a suitable form of closure or gate 2, pivoted, as at 5, so as to be vertically movable in a position transverse to the canal or ditch A. The gate 2 is approximately counterbalanced by a float 4 which rises and falls in correspondence with differences in elevation of a volume of fluid in a well 5$^a$. The gate 2 and the float 4 are connected to the extremities of a suitable lever or beam 6 which is fulcrumed upon a suitable support, as at 7.

In irrigation projects and districts where the use of water is carefully governed and where it is desired to provide means automatically operable to at all times control the volume of water passing through the ditch or canal, a simple and substantial controlling device is a desideratum.

The gate 2 is controlled in the present instance by fluctuations in the level of the water in the well 5$^a$. This variation of level of the water in the well 5$^a$ is nicely determined by means of a movable funnel 8 which may be screened over its upper surface, as at 9, and to which funnel 8 is connected at its lower portion a conduit 10, which is flexibly connected by suitable joints and connections, as 11, with a stationary pipe or conductor 12, which projects into the flume or canal close to its bottom surface.

The screened funnel or draining device 8 is adapted to stand with its screened surface approximately even with the level of the fluid or water in the canal A. For the purpose of avoiding the effect of the current and eddies upon the screened funnel 8 there may be formed in the canal A a recess or pocket 13 in which the water will rise evenly with the elevation of the water in the canal A.

The gate 2 is primarily adjusted above the floor of the canal A to permit a certain volume of water to flow into the canal A under pressure of a given head of water in the main supply in front of the gate. With these conditions given the float 4 is so adjusted relatively upon the lever 6 as to sustain the gate 2 in a given position so long as the head of water in front of the gate does not vary and so long as the level of the water behind the gate in the canal A remains the same.

The screened funnel or drain member 8 is vertically adjusted by an appropriate device, here shown as a rod 14, adjustably secured upon a projection or pin 15 which is supported by a bridge over the walls of the canal or flume A adjacent the funnel 8. The funnel 8 is adjusted in a position substantially even with the level of a given volume of water coming in the canal A. In the event that an increase occurs in the volume of water, from any cause whatsoever, a quantity in excess of the quantity normally intended to flow into the adjusted funnel will be added to the regular amount drained and flow through the conductor 12 into the well 5$^a$. This increase in the volume of water flowing into the drain 8 rises to the level in the well 5ª and lifts the float 4, which in turn acts through the lever 6 to lower the gate 2 to cut off a portion of the incoming water.

In the event there is a fall in the level of the water in the canal A and before the gate 2, from any cause whatsoever, there will cease to be any flow into the drain 8 and through the connections 11 and 12 to the well 5ª; in which event the stoppage of this supply of water to the well 5ª will cause the level of the water in the well to be gradually lowered by reason of a drain or bleeder pipe 16 which is connected to the lower portion of the well 5ª and led to a point immediately adjacent the rear side of the gate 2.

The suction of the incoming water beneath the gate 2 and adjacent the flume or canal A induces an increased velocity of current in the bleeder 16 so that the water in the well 5ª is rapidly drawn out.

Simultaneously as the float 4 is lowered, the gate 2 will be lifted to increase the supply of water passing into the canal A which will again result in a rise of the level in the canal A, bringing it again to the level of the adjusted screened funnel 8 into which a quantity of water will again begin to flow and be conducted by the connections 11 and 12 into the well again, increasing the elevation of the water and lifting the float 4 to again lower the gate 2.

To enhance the suction action of the bleeder discharge point 17 which is drawn in the direction of a flow of the current into the canal A, I find that by tapering the point 17 slightly a greater force of suction is produced.

One of the advantages of the present gate is that of governing the automatic operation due to variations of level of water in the canal A. This automatic governing operation is enhanced by the provision of the pointed discharge tip 17 of the bleeder 16 connecting with the well 5ª.

For each variation in the quantity of water to be led into the canal A there is a particular adjustment of the gate 2; a corresponding variation of the level of the float 4 in its well 5ª; and a corresponding adjustment of the governing screen 8.

As the water level in the canal A rises or falls and the increase or decrease of water passing into the screen 8 and through the conductor 12 to the well 5ª varies the level of water in the well, there is a corresponding automatic action between the position of the float 4 and the gate 2 to constantly and nicely determine the volume of water passing through the canal A from the main source of supply in front of the gate 2.

By this form or construction of gate I am enabled to entirely dispense with any form of weir or flush bar or other extraneous means for controlling the action of the gate in order to maintain a given level of water in the canal A.

Having thus described my invention, what I claim and desire to secure by Letters Patent, is—

1. A ditch gate, a fulcrum upon which the gate is hung, a lever connected at one end to the gate, a fulcrum upon which the lever is mounted, a float connected to the other end of the lever, a well in which the float may move, a canal in which the gate is operable, connections between said canal and the well, and means for varying the elevation of water in the well, said means including an adjustable device into which a quantity of water in the canal may be conducted into the well.

2. A ditch gate, a fulcrum upon which the gate is hung, a lever connected at one end to the gate, a fulcrum upon which the lever is mounted, a float connected to the other end of the lever, a well in which the float may move, a canal in which the gate is operable, connections between said canal and the well, means for varying the elevation of water in the well, said means including an adjustable device into which a quantity of water in the canal may be conducted into the well, and a bleeder connected to the well and having its discharge at a point adjacent the rear side of the gate.

3. A control for fluid conduits comprising a movable gate, instrumentalities whereby said gate is adjusted, and means for actuating said instrumentalities when there is a variation of level of the fluid in the conduit behind the gate, said means including an adjustable drain exposed to the fluid in the conduit and adapted to actuate the instrumentalities for adjusting the gate.

4. A control for fluid conduits comprising a main gate, a well connected to the conduit, a discharge conveying fluid from said well and discharging it at a point adjacent the rear side of the gate, connections between the well and the conduit including an adjustable drain normally conveying a portion of the fluid in the conduit to the well, a float in the well, and a fulcrumed lever upon the extremities of which are connected the gate and the float.

5. A control for conduits comprising an adjustable gate, a lever connected at one end to said gate, a float connected to the other end of the lever, a well in which the float is movable and in which the fluid may assume different levels, means for changing the level of the fluid in the well, said means including a conductor leading from the well into the conduit, a drain adjustable in a recess or pocket into which the fluid in the conduit may move, flexible connections between the screen and said conductor, a device for adjusting the drain, and a bleeder connected to the lower portion of the well and adapted to discharge fluid into the conduit at a point adjacent and rear of the gate so that the suction of the fluid traveling beneath the gate will cause an induced flow of fluid through the bleeder.

In testimony whereof I have hereunto set my hand in the presence of two subscribing witnesses.

ADONIRAM J. COLLAR.

Witnesses:
CARRA L. BUSH,
JAS. R. TAPSCOTT.